(12) United States Patent
Burger et al.

(10) Patent No.: US 8,090,711 B2
(45) Date of Patent: Jan. 3, 2012

(54) NORMALIZING RECORDS

(75) Inventors: Kenneth Joseph Burger, Rochester, MN (US); George Francis DeStefano, Rochester, MN (US); Susan Judith Funk, Rochester, MN (US); Andrew James Streit, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1821 days.

(21) Appl. No.: 10/675,266

(22) Filed: Sep. 30, 2003

(65) Prior Publication Data

US 2005/0071327 A1    Mar. 31, 2005

(51) Int. Cl.
*G06F 17/30* (2006.01)
*G06F 7/00* (2006.01)

(52) U.S. Cl. .................. 707/723; 707/802; 715/201

(58) Field of Classification Search .............. 707/723, 707/802; 715/201
See application file for complete search history.

(56) References Cited

U.S. PATENT DOCUMENTS

| | | | | |
|---|---|---|---|---|
| 5,603,025 | A * | 2/1997 | Tabb et al. ................. | 707/2 |
| 5,644,778 | A * | 7/1997 | Burks et al. ................ | 705/2 |
| 5,870,737 | A | 2/1999 | Dockter et al. | |
| 6,993,533 | B1 * | 1/2006 | Barnes ........................ | 707/102 |
| 7,009,609 | B2 * | 3/2006 | Miyadai ..................... | 345/440 |
| 2001/0037212 | A1 | 11/2001 | Motosuna et al. | |
| 2001/0053986 | A1 * | 12/2001 | Dick ........................... | 705/3 |
| 2001/0054008 | A1 | 12/2001 | Miller et al. | |
| 2002/0013786 | A1 * | 1/2002 | Machalek .................. | 707/503 |
| 2002/0035501 | A1 | 3/2002 | Handel et al. | |
| 2002/0062241 | A1 | 5/2002 | Rubio et al. | |
| 2002/0065813 | A1 | 5/2002 | Scanlon et al. | |
| 2002/0077857 | A1 | 6/2002 | Seelinger | |
| 2002/0198739 | A1 * | 12/2002 | Lau et al. ................... | 705/3 |
| 2003/0009392 | A1 | 1/2003 | Perkowski | |
| 2003/0009430 | A1 | 1/2003 | Burkey et al. | |

FOREIGN PATENT DOCUMENTS

| | | |
|---|---|---|
| JP | 2002135263 A | 5/2002 |
| WO | WO 0131537 A2 | 5/2001 |
| WO | WO 0263535 A2 | 2/2003 |

OTHER PUBLICATIONS

Ashenfelter, J. P. "Controling Data Display with Order by" O'Reilly Databases, Feb. 13, 2001, pp. 1-3.*
Pearson, Randy "Default Value" SQL Wiki, Dec. 14, 2000, p. 1.*
The Open Directory Project www.dmoz.org 1999.*

(Continued)

*Primary Examiner* — Jacob F Betit
(74) *Attorney, Agent, or Firm* — Owen J. Gamon

(57) ABSTRACT

A method, storage medium, and electronic device that in an embodiment register a plurality of information suppliers and a plurality of areas of interest associated with the plurality of respective information suppliers. One of the plurality of areas of interest associated with one of the plurality of information suppliers is found that matches a field of interest requested by a client. A plurality of records is requested from the one of the plurality of information suppliers. A model norm is created based on a data dictionary, wherein a format of the data dictionary is standardized by an agreement among the plurality of information suppliers. A subset of a plurality of characteristics is selected from the plurality of records based on the model norm. A report is prepared with the subset.

15 Claims, 7 Drawing Sheets

OTHER PUBLICATIONS

Open Directory Project Terms of Use, avilible at http://dmoz.org/termsofuse.html, as retirived Aug. 28, 2007 and as amended on Apr. 19, 2001.*

My SQL 5.0 Referance Manual 11.11.2, availible at http://www.mysql.org/doc/refman/5.0/en/group-by-modifiers.html, as retierved on Aug. 28, 2007.*

M.E. Miller et al, Case-Based Reasoning System for an Executive Briefing Book, IBM Technical Disclosure Bulletin, vol. 34, No. 4A, p. 380-381, Sep. 1991.

A. Kosmynin, An Information Broker for Adaptive Distributed Resource Directory Service, INSPEC Abstract Number: C9707-7210-024, WebNet96—World Conference of the Web Society, Proceedings p. 261-6, Assoc. Adv. Comput. Educ, 1996.

J. Honkela et al., GS Textplorer—Adaptive Framework for Information Retrieval, Inspec Abstract Number: C2003-04-7250R-092, Proceedings of SIGIR 2002, Twenty-Fifth Annual International ACM SIGIR Conference on Research and Development in Information Retrieval, p. 456, 2002.

* cited by examiner

| CHARACTERISTIC | DEFAULT |
|---|---|
| NAME | JOHN DOE |
| ZIP CODE | 55901 |
| STATE | MINNESOTA |
| INCOME | $0 |

DATA DICTIONARY

FIG. 3

| CHARACTERISTIC | RELATIVE SIGNIFICANCE | DEFAULT VALUE | SORT RULE |
|---|---|---|---|
| ZIP CODE | 3 | 55901 | |
| STATE | 2 | MINNESOTA | |
| NAME | 1 | JANE ROE | |
| INCOME | 4 | $0 | |

FAVORED NORM

| | CHARACTERISTIC | RELATIVE SIGNIFICANCE | DEFAULT VALUE | SORT RULE |
|---|---|---|---|---|
| 505 | STATE | 3 | MINNESOTA | |
| 510 | ZIP CODE | 1 | 55901 | |
| 515 | INCOME | 2 | $0 | DESC |

MODEL NORM

| | 621 | 622 | 624 | 626 |
|---|---|---|---|---|
| | NAME | ZIP CODE | STATE | INCOME |
| 605 | FRED | 60609 | ILLINOIS | $36,500 |
| 610 | JAMES | 78758 | TEXAS | $43,000 |
| 615 | WILMA | 55402 | MINNESOTA | $37,000 |
| 620 | RON | 55901 | MINNESOTA | $45,000 |

RECORDS

| | 672 | 674 | 676 |
|---|---|---|---|
| | ZIP CODE | INCOME | STATE |
| 655 | 55901 | $45,000 | MINNESOTA |
| 660 | 78758 | $43,000 | TEXAS |
| 665 | 55402 | $37,000 | MINNESOTA |
| 670 | 60609 | $36,500 | ILLINOIS |

REPORT

FIG. 6B

NORMALIZING RECORDS

FIELD

This invention generally relates to information retrieval and more specifically relates to preparing a report from records based on a model norm.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated and complex computer software has evolved to take advantage of the higher performance of the hardware, resulting in computer systems today that are much more powerful than just a few years ago.

One way that computers have become more complex and powerful has been by the connection of computers via networks. By connecting to a network, one computer, often called a client, may access information on various other computers, often called servers. The servers may provide information in a variety of formats, which causes the client difficulty in interpreting information. For example, one supplier of telephone information may supply records including a name field, a telephone number field, and an email address field. Another supplier of telephone information may supply records including a name field, and street address field, and a telephone number field. Thus, although both suppliers provide telephone information, they provide records with some common fields, some different fields, and the fields may be ordered differently within the records. This inconsistent nature of the different records causes the client difficulty in analyzing and interpreting the retrieved information.

Without a better way to organize information retrieved from different information suppliers, users will not be able to take advantage of the full power of computers.

SUMMARY

A method, storage medium, and electronic device are provided that in an embodiment register a plurality of information suppliers and a plurality of areas of interest associated with the plurality of respective information suppliers. One of the plurality of areas of interest associated with one of the plurality of information suppliers is found that matches a field of interest requested by a client. A plurality of records is requested from the one of the plurality of information suppliers. A model norm is created based on a data dictionary, wherein a format of the data dictionary is standardized by agreement among the plurality of information suppliers. A subset of a plurality of characteristics is selected from the plurality of records based on the model norm. A report is prepared with the subset. The subset of the plurality of characteristics is ordered in the report based on a relative significance of the characteristics in the model norm, wherein the relative significance specifies a different order of the characteristics than the plurality of records. The plurality of records is ordered in the report based on a sort rule in the model norm. A favored norm is received from the one of the plurality of information suppliers of a selected record in the report. A second subset of the plurality of characteristics is selected from the plurality of records, wherein the favored norm specifies the second subset. A second report is created with the second subset.

BRIEF DESCRIPTION OF THE DRAWINGS

FIG. 3 depicts a block diagram of an example data structure for a data dictionary, according to an embodiment of the invention.

FIG. 4 depicts a block diagram of an example data structure for a favored norm, according to an embodiment of the invention.

FIG. 5 depicts a block diagram of an example data structure for a model norm, according to an embodiment of the invention.

FIG. 6A depicts a block diagram of an example data structure for records prior to being normalized, according to an embodiment of the invention.

FIG. 6B depicts a block diagram of an example data structure for a report, according to an embodiment of the invention.

DETAILED DESCRIPTION

In an embodiment, a data assembler attracts clients who wish to rely on the data assembler's expertise in an area of interest. The data assembler generates a model norm, which reflects the data assembler's opinion on the format and organization of a report in the area of interest. When a client requests a report on the area of interest, the data assembler finds the appropriate information suppliers, retrieves records from the information suppliers, and a data normalizer creates a report in the format specified by the model norm. While the records may contain many fields or characteristics, the data normalizer selects those characteristics that are specified by the model norm and includes them in the report. The data normalizer further orders the selected characteristics as specified by the model norm and also orders the records within the report based on the model norm. In this way, records received from disparate information suppliers are organized into a consistent format, which is more convenient for the client.

Figure 1:
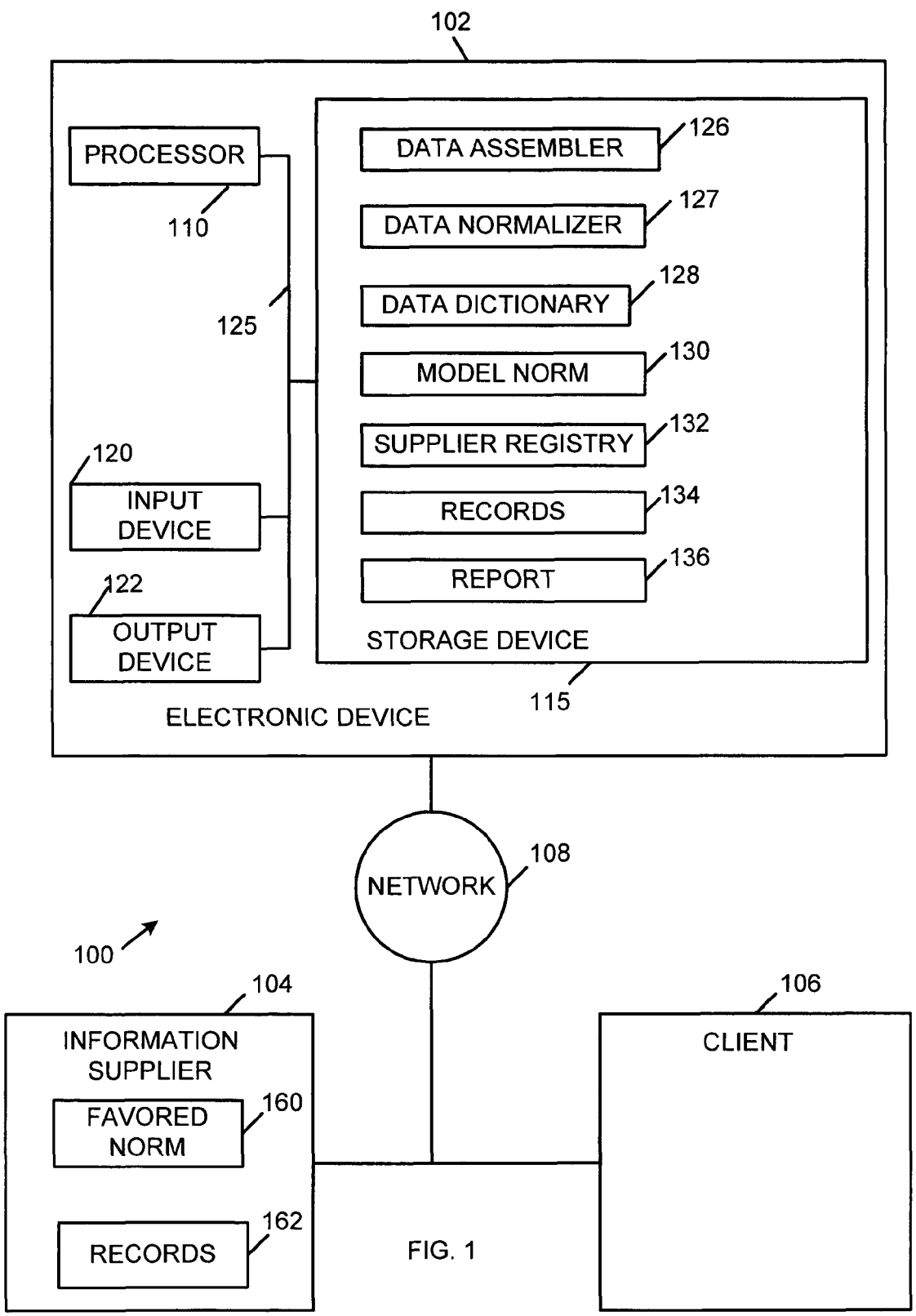
FIG. 1 depicts a block diagram of an example system for implementing an embodiment of the invention.

Referring to the Drawing, wherein like numbers denote like parts throughout the several views, FIG. 1 depicts a block diagram of an example system 100 for implementing an embodiment of the invention. The system 100 includes an electronic device 102, an information supplier 104, and a client 106, all connected via a network 108. Although only one electronic device 102, one information supplier 104, one client 106, and one network 108 are shown, in other embodiments any number or combination of them may be present. Although the information supplier 104 and the client 106 are illustrated as being connected to the electronic device 102 via the same network 108, in other embodiments they may be connected to the electronic device 102 via different networks. Although the electronic device 102, the information supplier 104, the client 106, and the network 108 are illustrated in FIG. 1 as being discrete, separate components, in other embodiments some or all of their functions and elements may be combined.

In an embodiment, the electronic device 102 functions as a server. The electronic device 102 includes a processor 110, a storage device 115, an input device 120, and an output device 122, all connected directly or indirectly via a bus 125. The processor 110 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 110 executes instructions and includes that portion of the electronic device 102 that controls the operation of the entire electronic device. Although not depicted in FIG. 1, the processor 110 typically includes a control unit that organizes data and program storage in memory and transfers data and other information between the various parts of the electronic device 102. The processor 110 reads and/or writes code and data to/from the network 108, the storage device 115, the input device 120, and/or the output device 122.

Although the electronic device 102 is drawn to contain only a single processor 110 and a single bus 125, embodiments of the present invention apply equally to electronic devices that may have multiple processors and multiple buses with some or all performing different functions in different ways.

The storage device 115 represents one or more mechanisms for storing data. For example, the storage device 115 may include read only memory (ROM), random access memory (RAM), magnetic disk storage media, optical storage media, flash memory devices, and/or other machine-readable media. In other embodiments, any appropriate type of storage device may be used. Although only one storage device 115 is shown, multiple storage devices and multiple types of storage devices may be present. Although the storage device 115 is shown in FIG. 1 as a single monolithic entity, the storage device 115 may in fact be distributed and/or hierarchical, as is known in the art. For example, the storage device 115 may exist in multiple levels of caches, and these caches may be further divided by function, so that one cache holds instructions while another holds non-instruction data which is used by the processor or processors. The storage device 115 may further be distributed and associated with different processors or sets of processors, as is known in any of various so-called non-uniform memory access (NUMA) computer architectures. Further, although the electronic device 102 is drawn to contain the storage device 115, it may be distributed across other electronic devices, such as devices connected to the network 108.

The storage device 115 includes a data assembler 126, a data normalizer 127, a data dictionary 128, a model norm 130, a supplier registry 132, records 134, and a report 136, all of which may in various embodiments have any number of instances. Although the data assembler 126, the data normalizer 127, the data dictionary 128, the model norm 130, the supplier registry 132, the records 134, and the report 136 are all illustrated as being contained within the storage device 115 in the electronic device 102, in other embodiments some or all of them may be on different electronic devices and may be accessed remotely, e.g., via the network 108.

The data assembler 126 registers the information suppliers 104 in the supplier registry 132 and creates the model norm 130. In an embodiment, the data assembler 126 selects the information suppliers 104 based on the opinions of the designers of the data assembler 126, based on input from users, based on content of a publicly accessible registry, or based on any combination thereof. The data assembler 126 receives requests for information from the client 106 and in response finds the appropriate information suppliers 104 using the supplier registry 132. The data assembler 126 then sends a request to the appropriate information supplier(s) 104 and receives records from the information supplier(s) 104, which the data assembler 126 stores as the records 134. The data normalizer 127 then creates the report 136 based on the records 134 using the model norm 130 and sends the report 136 to the client 106 in response to the client's request.

In an embodiment, the data assembler 126 and the data normalizer 127 include instructions capable of executing on the processor 110 or statements capable of being interpreted by instructions executing on the processor 110 to carry out the functions as further described below with reference to FIG. 7. In another embodiment, the data assembler 126 and/or the data normalizer 127 may be implemented in hardware via logic gates and/or other appropriate hardware techniques in lieu of or in addition to a processor-based system.

The supplier registry 132 is further described below with reference to FIG. 2. The data dictionary 128 is further described below with reference to FIG. 3. The model norm 130 is further described below with reference to FIG. 5. The report 136 is further described below with reference to FIG. 6B.

The input device 120 may be a keyboard, mouse or other pointing device, trackball, touchpad, touchscreen, keypad, microphone, voice recognition device, or any other appropriate mechanism for the user to input data to the electronic device 102 and/or to manipulate the user interfaces of the electronic device 102. Although only one input device 120 is shown, in another embodiment any number and type of input devices may be present. The input device 120 may be used to interact with and manipulate the user interfaces of the electronic device 102, if any.

The output device 122 is that part of the electronic device 102 that presents output to the user. The output device 122 may be a cathode-ray tube (CRT) based video display well known in the art of computer hardware. But, in other embodiments the output device 122 may be replaced with a liquid crystal display (LCD) based or gas, plasma-based, flat-panel display. In still other embodiments, any appropriate display device may be used. In other embodiments, a speaker or a printer may be used. In other embodiments any appropriate output device may be used. Although only one output device 122 is shown, in other embodiments, any number of output devices of different types or of the same type may be present. The output device 122 may display or otherwise present the user interfaces of the electronic device 102, if any.

The bus 125 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller). Although the bus 125 is shown in FIG. 1 as a relatively simple, single bus structure providing a direct communication path between the processor 110, the storage device 115, the input device 120, and the output device 122, in other embodiments the bus 125 may comprise multiple different buses or communication paths, which may be arranged in any of various forms, such as point-to-point links in hierarchical, star or web configurations, multiple hierarchical buses, or parallel and redundant paths. Furthermore, while the bus 125 is shown directly connected to the processor 110, the storage device 115, the input device 120, and the output device 122, in other embodiments, some or all of the I/O (Input/Output) devices may be connected via I/O processors.

The electronic device 102 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, and mainframe computers are examples of other possible configurations of the electronic device 102. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The information supplier 104 may be an electronic device including hardware and optional software components analogous to the electronic device 102 previously described above. The information supplier 104 may function as a server and includes a favored norm 160 and records 162. The information supplier 104 registers its area of interest with the electronic device 102 and supplies the favored norm 160 and records 162 in response to a request from the electronic device 102. Although the favored norm 160 and the records 162 are illustrated as being separate entities, in anther embodiment they may be combined. The favored norm 160 indicates the information supplier's 104 view of how the characteristics in the records 162 should be organized and how the records 162 should be sorted. The favored norm 160 is further described below with reference to FIG. 4. A data structure for the records 162 is further described below with reference to FIG. 6A.

The client 106 may be an electronic device including hardware and optional software components analogous to the electronic device 102 previously described above. The client 106 sends requests for information to the electronic device 102 and receives reports from the electronic device 102.

The network 108 may be any suitable network or combination of networks and may support any appropriate protocol suitable for communication of data and/or code between the electronic device 102, the information supplier 104, and the client 106. In various embodiments, the network 108 may represent a storage device or a combination of storage devices. In an embodiment, the network 108 may support Infiniband. In another embodiment, the network 108 may support wireless communications. In another embodiment, the network 108 may support hard-wired communications, such as a telephone line or cable. In another embodiment, the network 108 may support the Ethernet IEEE (Institute of Electrical and Electronics Engineers) 802.3×specification. In another embodiment, the network 108 may be the Internet and may support IP (Internet Protocol). In another embodiment, the network 108 may be a local area network (LAN) or a wide area network (WAN). In another embodiment, the network 108 may be a hotspot service provider network. In another embodiment, the network 108 may be an intranet. In another embodiment, the network 108 may be a GPRS (General Packet Radio Service) network. In another embodiment, the network 108 may be a FRS (Family Radio Service) network. In another embodiment, the network 108 may be any appropriate cellular data network or cell-based radio network technology. In another embodiment, the network 108 may be an IEEE 802.11B wireless network. In still another embodiment, the network 108 may be any suitable network or combination of networks. Although one network 108 is shown, in other embodiments any number of networks (of the same or different types) may be present.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs."

The computer programs typically comprise one or more instructions that are resident at various times in various memory and storage devices in the electronic device 102, and that, when read and executed by one or more processors in the electronic device 102, cause the electronic device 102 to perform the steps necessary to execute steps or elements embodying the various aspects of an embodiment of the invention.

Moreover, while embodiments of the invention have and hereinafter will be described in the context of fully functioning electronic devices, the various embodiments of the invention are capable of being distributed as a program product in a variety of forms, and the invention applies equally regardless of the particular type of signal-bearing medium used to actually carry out the distribution. The programs defining the functions of this embodiment may be delivered to the electronic device 102 via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, e.g., the network 108, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
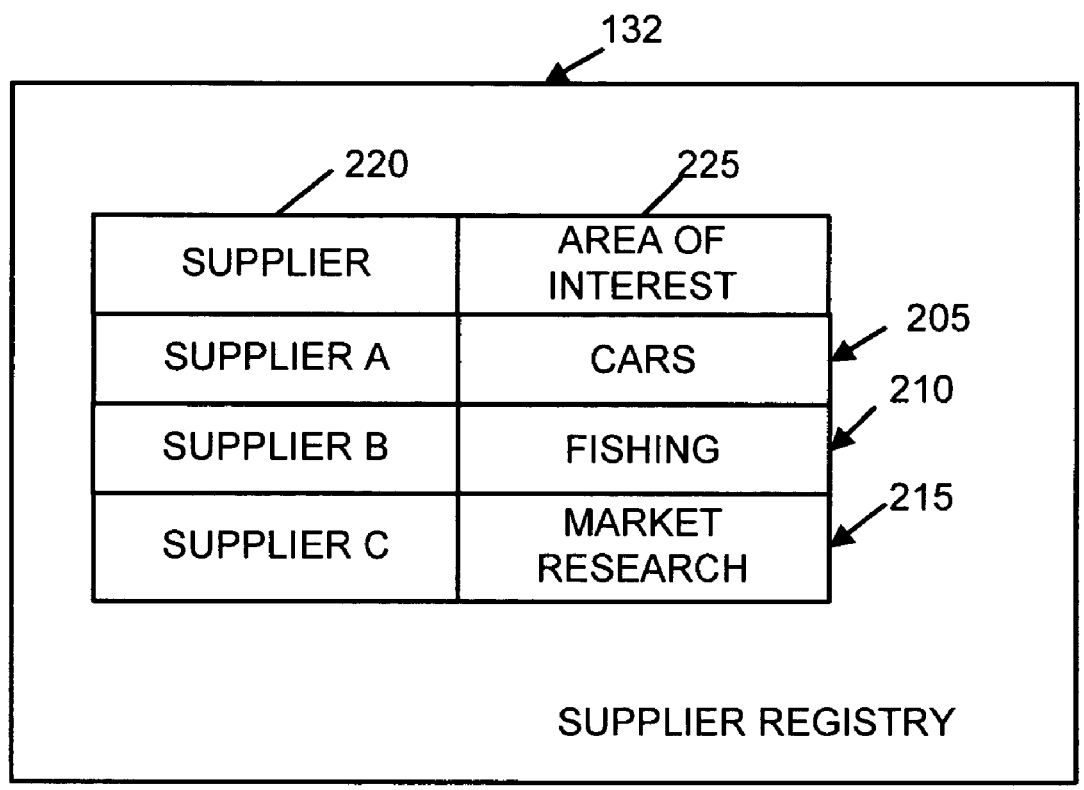
FIG. 2 depicts a block diagram of an example data structure for a supplier registry, according to an embodiment of the invention.

FIG. 2 depicts a block diagram of an example data structure for the supplier registry 132, according to an embodiment of the invention. The supplier registry 132 includes entries 205, 210, and 215, but in other embodiments any number of entries may be present. Each entry includes a supplier 220 and an area of interest 225. The supplier 220 indicates a supplier of information, such as the information supplier 104. The area of interest 225 indicates an area or category of information that the supplier 220 is capable of providing. Examples of areas of interest as illustrated in FIG. 2 are cars, fishing, and market research, but in other embodiments any appropriate areas of interest may be used.

FIG. 3 depicts a block diagram of an example data structure for the data dictionary 128, according to an embodiment of the invention. In an embodiment, one data dictionary 128 includes information regarding all areas of interest, but in another embodiment each area of interest has its own associated data dictionary 128. The data dictionary 128 describes a data definition for fields in a record of information, such as the records 134. The data dictionary 128 includes entries 302, 304, 306, and 308, but in other embodiments any number of entries may be present. Each entry includes a characteristic 310 and a default 312. The characteristic 310 identifies a field in the records 134. In the example shown in FIG. 3, the fields in the records 134 are a name field, a zip code field, a state field, and an income field, but in another embodiments any appropriate fields may be identified in the characteristic 310. The default 312 indicates a default value for the field identified by the associated characteristic 310. In the example shown in FIG. 3, the name field has a default value of "John Doe," the zip code field has a default value of "55901," the state field has a default value of "Minnesota," and the income field has a default of "$0", but in other embodiments any appropriate default values may be used. In other embodiments, the entries in the data dictionary 128 may include more elements in addition to the characteristic 310 and the default 312.

In an embodiment, the format and contents of data dictionary 128 may be standardized by an agreement among the information suppliers 104. The standardization of the characteristics 310 and their data-types and usage allows the data normalizer 127 to create the report 136 by matching the characteristics in the model norm 130 to the characteristics in the favored norm 160, as further described below with reference to FIGS. 4, 5, and 7.

FIG. 4 depicts a block diagram of an example data structure for the favored norm 160, according to an embodiment of the invention. The favored norm 160 includes entries 405, 410, 415, and 420, but in other embodiments any appropriate number of records may be present. Each entry includes a characteristic 422, a relative significance 424, a default value 426, and a sort rule 428. The characteristic 422 identifies a field in the records 134. The relative significance 424 indicates the information supplier's 104 opinion or view of the relative significance of the associated characteristic 422, i.e., the relative order of the associated characteristic 422 with respect to other characteristics. The default value 426 indicates the information supplier's 104 opinion or view of the default value of the associated characteristic 422. In other embodiments, the default value 426 is optional or not present. The data normalizer 127 may generate a default value, even for characteristics not drawn from the data dictionary 128, based on the characteristic's data type. The sort rule 428 indicates the information supplier's 104 opinion or view of how the records 134 are to be sorted. In an embodiment, the sort rule 428 indicates the information supplier's 104 view of the sort order of the records 162.

FIG. 5 depicts a block diagram of an example data structure for the model norm 130, according to an embodiment of the invention. The model norm 130 includes entries 505, 510, and 515 but in other embodiments any number of entries may be present. Each entry includes a characteristic 522, a relative significance 524, a default value 526, and a sort rule 528. The characteristic 522 identifies an associated field in the records 134. The data normalizer 127 uses the characteristic 522 to determine which fields to select from the records 134 and include in the report 136. The relative significance 524 indicates a relative significance of the associated characteristic 522, and the data normalizer 127 uses the relative significance 524 to order the characteristics in the report 136 as further described below with reference to FIG. 7. The default value 526 indicates a default of the associated characteristic 522, which the data normalizer 130 uses to fill in the report 136 if the associated characteristic does not have an assigned value in the records 134, as further described below with reference to FIG. 7. The sort rule 528 indicates how records are to be sorted, and the data normalizer 127 uses the sort rule 528 to sort the records in the report 136, as further described below with reference to FIG. 7. In an embodiment, the sort rule 528 may indicate that records are to be sorted in ascending order, descending order, or in any other appropriate order. The sort rule 528 may also indicate whether the associated characteristic is to be used as a sort field and any associated sorting information, e.g., the direction of the sort such as ascending or descending and a sort priority.

FIG. 6A depicts a block diagram of an example data structure for the records 162 prior to being normalized by the data normalizer 127, according to an embodiment of the invention. The records 162 include records 605, 610, 615, and 620, but in other embodiments any number of records with any appropriate data may be present. Each record includes characteristics 621, 622, 624, and 626, but in other embodiments any number of characteristics with any appropriate characteristic names may be used.

FIG. 6B depicts a block diagram of an example data structure for the report 136 after being normalized by the data normalizer 127, according to an embodiment of the invention. The report 136 includes records 655, 660, 665, and 670, but in other embodiments any number of records may be present. In an embodiment, all of the records 655, 660, 665, and 670 originate from the same information supplier 104. In another embodiment, some or all of the records 655, 660, 665, and 670 originate from different information suppliers 104.

Each record includes characteristics 672, 674, and 676, which the data normalizer 127 selects from the records 134 because they exist in the model norm 130. The data normalizer 127 orders the characteristics 672, 674, and 676 in the report 136 based on the relative significance 524 in the model norm 130, which may have a different order from the records 162, e.g., as shown in FIG. 6A. Thus, using the example of the model norm 130 in FIG. 5, the zip code characteristic 672 has a relative significance 524 in the model norm 130 of "1," so the zip code characteristic 672 is ordered first (placed in the leftmost column) in the report 136. The income characteristic 674 has a relative significance 524 in the model norm 130 of "2," so the income characteristic 674 is ordered second (placed in the centermost column) in the report 136. The state characteristic 676 has a relative significance 524 of "3," in the model norm 130, so the state characteristic 670 is ordered third (placed in the rightmost column) in the report 136. In other embodiments, the characteristics may be ordered right-to-left, up-to-down, down-to-up, or in any other appropriate order in the report 136 based on the relative significance 524 in the model norm 130.

The data normalizer 127 has not included the name characteristic 621 (FIG. 6A) in the report 136, because it does not exist in the model norm 130. Thus, the name characteristic 621 is an extra characteristic because it is included in the favored norm 160 (as shown in FIG. 4) but not in the model norm 130 (as shown in FIG. 5). In the embodiment shown in FIG. 6B, the data normalizer 127 has omitted the extra characteristic (in this example the name characteristic 621).

In another embodiment, the data normalizer 127 presents each record's extra characteristic(s) as a sequence of name-value pairs in a single least-significant column ordered in the sequence within the column as indicated by the relative significance 424 in the favored norm 160 (FIG. 4). This embodiment may be especially useful when the report 136 is made up of information from multiple information suppliers 104.

In another embodiment, the data normalizer 127 presents any extra characteristic(s) in a series of less-significant columns ordered as indicated by the relative significance 424 in the favored norm 160 (FIG. 4). This embodiment may be especially useful when the report 136 is made up of information from a single information supplier 104.

In another embodiment, the data normalizer 127 provides a single least-significant column in the report 136 containing a visual indicator of whether extra characteristics are available for each report record.

The data normalizer 127 orders the records 655, 660, 665, and 670 based on the sort rule 528 in the model norm 130, which may have a different order from the records 162, e.g., as illustrated in FIG. 6A. Using the example of FIG. 5, the sort rule 528 for the income characteristic 674 is "desc.," which indicates that the income characteristic is to be used as a sort field and the records are to be in descending order. Thus, the data normalizer 127 orders the records 655, 660, 665, and 670 within the report 136 from the highest income at the top to the lowest income at the bottom, but in other embodiments any appropriate sort order of the records may be used.

Figure 7:
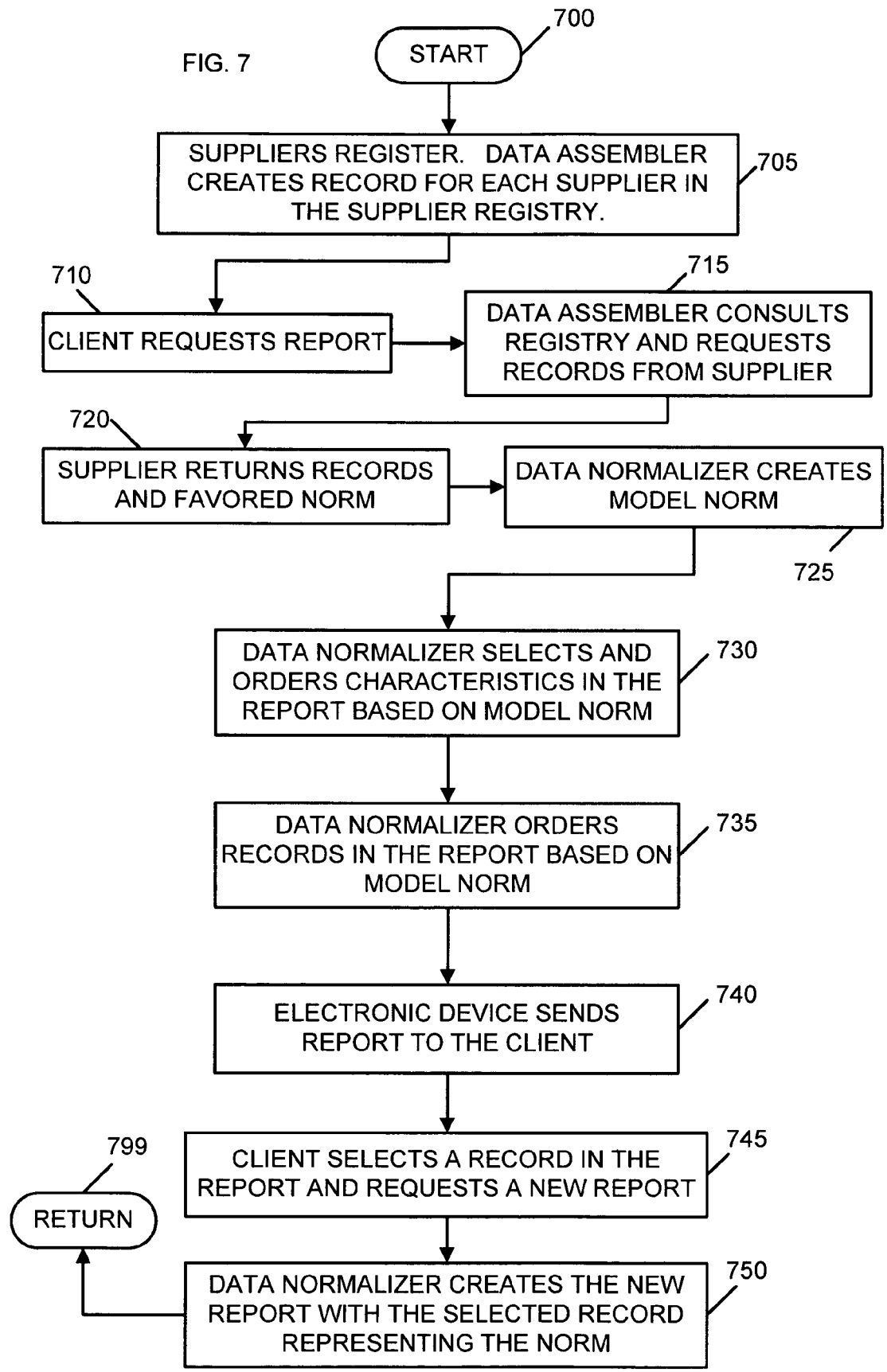
FIG. 7 depicts a flowchart of example processing, according to an embodiment of the invention.

FIG. 7 depicts a flowchart of example processing, according to an embodiment of the invention. Control begins at block 700. Control then continues to block 705 where the information supplier 104 registers with the data assembler 126. The data assembler 126 creates an entry in the supplier registry 132 for each registered information supplier 104 and stores an identifier of the information supplier 104 in the supplier 220 in the entry and an identifier of the area of interest associated with the information supplier 104 in the area of interest 225 in the entry. The data assembler 126 also creates the data dictionary 128 based on common characteristics for the field of interest among the information suppliers 104.

Control then continues to block 710 where the client 106 requests a report on a field of interest from the electronic device 102.

Control then continues to block 715 where the data assembler 126 consults the supplier registry 132 and finds a match in the area of interest 225 for the client's area of interest and requests records from the associated information supplier 220 in the found entry, such as the information supplier 104. Control then continues to block 720 where the information supplier 104 returns the records 162 and the favored norm 160 to the data assembler 126.

Control then continues to block 725 where the data normalizer 127 creates the model norm 130. In various embodiments, the data normalizer 127 may create the model norm 130 based on the favored norm 160, based on the data dictionary 128, based on the judgment of the designer of the data normalizer 127, based on any other appropriate criteria, or based on any combination thereof.

Control then continues to block 730 where the data normalizer 127 selects characteristics from the records 134 based on the characteristics specified in the model norm 130 and orders the selected characteristics in the report 136 based on the relative significance 524 in the model norm 130. Control then continues to block 735 where the data normalizer 127 orders the records 134 in the report 136 based on the sort rule 528 in the model norm 130. The data normalizer 127 further propagates the records with the values in the default values 526 if the records lack values. Control then continues to block 740 where the data normalizer 127 sends the report 136 to the client 106.

Control then continues to block 745 where the client 106 selects a record in the report 136 and requests a new report. Control then continues to block 750 where the data normalizer 127 creates a new report based on the favored norm 160 associated with the selected record. The data normalizer 127 selects the characteristics specified in the favored norm 160 and orders them in the new report based on the relative significance 424 in the favored norm 160 associated with the selected record. The data normalizer 127 further sorts the records in the new report based on the sort rule 428 in the favored norm 160 associated with the selected record. In another embodiment, the data normalizer 127 creates the new report based on a preferred norm supplied by the client 106. Control then continues to block 799 where the logic returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
    registering a plurality of information suppliers and a plurality of areas of interest associated with the plurality of respective information suppliers;
    finding one of the plurality of areas of interest associated with one of the plurality of information suppliers that matches a field of interest requested by a client;
    requesting a plurality of records from the one of the plurality of information suppliers;
    creating a model norm based on a data dictionary, wherein a format of the data dictionary is standardized by an agreement among the plurality of information suppliers;
    selecting a subset of a plurality of characteristics from the plurality of records based on the model norm;
    preparing a report with the subset;
    ordering the subset of the plurality of characteristics in the report based on a relative significance of the characteristics in the model norm, wherein the relative significance specifies a different order of the characteristics than the plurality of records;
    ordering the plurality of records in the report based on a sort rule in the model norm;
    receiving a favored norm from the one of the plurality of information suppliers of a selected record in the report;
    selecting a second subset of the plurality of characteristics from the plurality of records, wherein the favored norm specifies the second subset; and
    creating a second report with the second subset.

2. The method of claim 1, wherein the preparing the report further comprises:
    preparing extra characteristics not in the subset in a least-significant column of the report as a sequence of name-value pairs.

3. The method of claim 2, wherein the preparing, extra characteristics further comprises:
    ordering the name-value pairs based on a relative significance in a favored norm.

4. A storage medium comprising:
    means for registering a plurality of information suppliers and a plurality of areas of interest associated with the plurality of respective information suppliers;
    means for finding one of the plurality of areas of interest associated with one of the plurality of information suppliers that matches a field of interest requested by a client;

means for requesting a plurality of records from the one of the plurality of information suppliers;

means for creating a model norm based on a data dictionary, wherein a format of the data dictionary is standardized by an agreement among the plurality of information suppliers;

means for selecting a subset of a plurality of characteristics from the plurality of records based on the model norm;

means for preparing a report with the subset;

means for ordering the subset of the plurality of characteristics in the report based on a relative significance of the characteristics in the model norm, wherein the relative significance specifies a different order of the characteristics than the plurality of records;

means for receiving a favored norm from the one of the plurality of information suppliers of a selected record in the report;

means for selecting a second subset of the plurality of characteristics from the plurality of records, wherein the favored norm specifies the second subset; and means for creating a second report with the second subset.

5. The storage medium of claim 4, wherein the means for preparing further comprises:

means for preparing extra characteristics not in the subset in a least-significant column of the report as a sequence of name-value pairs.

6. The storage medium of claim 4, wherein the means for preparing further comprises:

means for preparing extra characteristics not in the subset in a series of columns ordered based on a relative significance in a favored norm.

7. The storage medium of claim 4, wherein the means for preparing further comprises:

means for preparing an indicator of whether extra characteristics not in the subset are available.

8. The storage medium of claim 4, further comprising:

means for ordering the plurality of records in the report based on a sort rule in the model norm.

9. A storage medium encoded with instructions, wherein the instructions when executed comprise:

registering a plurality of information suppliers and a plurality of areas of interest associated with the plurality of respective information suppliers;

finding one of the plurality of areas of interest associated with one of the plurality of information suppliers that matches a field of interest requested by a client;

requesting a plurality of records from the one of the plurality of information suppliers;

creating a model norm based on a data dictionary, wherein a format of the data dictionary is standardized by an agreement among the plurality of information suppliers;

selecting a subset of a plurality of characteristics from a plurality of records received from the one of a plurality of information suppliers, wherein the selecting of the subset is based on the model norm;

preparing a first report with the subset, wherein the preparing further comprises ordering the plurality of records in the first report based on a sort rule in the model norm;

ordering the subset of the plurality of characteristics in the first report based on a relative significance of the characteristics in the model norm, wherein the relative significance specifies a different order of the characteristics than the records;

receiving a favored norm from the one of the plurality of information suppliers;

selecting a second subset of the plurality of characteristics from the plurality of records, wherein the favored norm specifies the second subset; and creating a second report with the second subset.

10. The storage medium of claim 9, wherein the creating further comprises:

ordering the subset of the plurality of characteristics in the second report based on a relative significance in the favored norm.

11. The storage medium of claim 9, wherein the creating further comprises:

ordering the plurality of records in the second report based on a sort rule in the favored norm.

12. An electronic device comprising:

a processor; and a storage device encoded with instructions, wherein the instructions when executed on the processor comprise:

registering a plurality of information suppliers and a plurality of areas of interest associated with the plurality of respective information suppliers;

finding the plurality of areas of interest associated with the plurality of information suppliers that match a field of interest requested by a client;

requesting a plurality of records from the plurality of information suppliers;

creating a model norm based on a data dictionary, wherein a format of the data dictionary is standardized by an agreement among the plurality of information suppliers, selecting a first subset of a plurality of characteristics from the plurality of records received from the plurality of information suppliers, wherein the selecting the first subset is based on the model norm, preparing a first report with the first subset, ordering the first subset of the plurality of characteristics in the first report based on a relative significance of the characteristics in the model norm, wherein the relative significance specifies a different order of the characteristics than the records, ordering the plurality of records in the first report based on a sort rule in the model norm, receiving a favored norm from one of the plurality of information suppliers, wherein the one of the plurality of information suppliers is associated with a selected record in the first report, selecting a second subset of the plurality of characteristics from the plurality of records, wherein the favored norm specifies the second subset, and creating a second report with the second subset.

13. The electronic device of claim 12, wherein the creating further comprises:

ordering the second subset in the second report based on a relative significance in the favored norm.

14. The electronic device of claim 12, wherein the creating further comprises:

ordering the plurality of records in the second report based on a sort rule in the favored norm.

15. The electronic device of claim 12, wherein the instructions further comprise:

propagating the plurality of records with a default value specified in the model norm if the plurality of records lack a value.

* * * * *